United States Patent [19]

Clark, Jr.

[11] 3,911,138

[45] Oct. 7, 1975

[54] ARTIFICIAL BLOOD AND METHOD FOR SUPPORTING OXYGEN TRANSPORT IN ANIMALS

[75] Inventor: Leland C. Clark, Jr., Cincinnati, Ohio

[73] Assignee: Children's Hospital, Inc., of Cincinnati, Ohio, Cincinnati, Ohio

[22] Filed: Feb. 26, 1973

[21] Appl. No.: 335,454

[52] U.S. Cl. .............................................. 424/352
[51] Int. Cl.² .................................... A61K 31/025
[58] Field of Search .................................. 424/352

[56] References Cited
OTHER PUBLICATIONS

Fujita et al., Chem. Abst., Vol. 75, (1971), p. 86881w.
Malchesky et al., Chem. Abst., Vol. 74, (1971), p. 51336z.
Sloviter, Chem. Abst., Vol. 73, (1970), p. 54138b.

*Primary Examiner*—Sam Rosen
*Attorney, Agent, or Firm*—Wood, Herron & Evans

[57] ABSTRACT

Perfluorocyclocarbons and emulsions containing emulsified particles of these perfluorocarbons are useful is supporting life as intravascular oxygen and carbon dioxide transport agents. Stable emulsions of perfluorocarbocyclic derivatives are prepared for use as artificial bloods and perfusates for organs. Intravenously infused emulsions containing perfluorocyclocarbons such as perfluoro(methylcyclohexane), perfluoro(1,3-dimethylcyclohexane), perfluoro(decahydronaphthalene), perfluoro(decahydro-1-methylnaphthalene), perfluoro(decahydrodimethylnaphthalene), and the like, serve as intravascular oxygen and carbon dioxide transport agents. Fluorocarbon liquids are also useful as an external respiration media for transporting oxygen-carbon dioxide necessary to support intravascular respiration. Perfluorocyclocarbons have been found after intravenous emulsion infusion as artificial bloods to collect in the reticuloendothelial system (RES) of the amimal body. However, it has also been found that perfluorocyclocarbon compounds leave the RES of the animal body and certain of these compounds, e.g., perfluoro(-decahydronaphthalene), leave the RES at a much faster rate than others. Furthermore, after the intravenously infused perfluorocyclocarbon emulsions function as artificial bloods, the perfluorocyclocarbons have the capability of leaving the animal body through the tissue, e.g., the lungs and skin.

19 Claims, 1 Drawing Figure

ARTIFICIAL BLOOD AND METHOD FOR SUPPORTING OXYGEN TRANSPORT IN ANIMALS

The invention described herein was made in the course of work under a grant from the Department of Health, Education and Welfare.

BACKGROUND OF THE INVENTION

Several years ago it was discovered that animals could survive breathing oxygen-saturated perfluorinated liquids, such as the isomers of perfluorotetrahydrofuran and perfluorotributylamine. Animals not only survived the breathing period but returned to apparently normal health afterwards as reported by Clark, L. C., et. al., "Survival of Mammals Breathing Organic Liquids Equilibrated with Oxygen at Atmospheric Pressure", Science 152: 1755–1756 (1966) and Gollan, F. and L. C. Clark, Jr., "Rapid Decompression of Mice Brething Fluorocarbon Liquid at 500 PSI", Alabama Journal of Medical Sciences, 4:336–337 (1967). This demonstration both oxygen carrying capacity and probable lack of toxicity of these liquids. The fluorotetrahydrofuran was also used as a perfusion media for an isolated heart as reported in Gollan, F. and L. C. Clark, Jr., The Physiologist 9:191, (1966). Sloviter, et. al., reported that dispersions of perfluorotetrahydrofuran were equal, if not superior, to suspensions of erythrocytes in buffered electrolytes in sustaining the function and metabolism of isolated perfused rat brain, Nature 216:458 (1967). The survival of a rabbit following infusion of a perfluorotributylamine where about one-third of the blood was replaced, was reported by L. C. Clark, Jr., in Edmond Hall Lecture, University of Louisville Sigma-Xi, May 19, 1967, Welch, Louisville Times, May 20, 1967. Geyer, et. al., have disclosed that emulsions of fluorocarbon liquids can be used to almost entirely replace the blood of intact rats and that these animals react well when kept in an oxygen atmosphere, Federation Proc. 27:384, 1968 and Organ Perfusion and Preservation, edited by J. C. Norman, New York: Appleton-Century-Crofts, 1968, Page 85–96. Clark, et. al., reported the perfusion of whole animals with perfluorinated blood emulsions using the Clark bubble-defoam heart-lung machine, Federation Proc., 29:1764 (1970) and the physiology of synthetic blood made from fluorocarbon emulsions in the Journal of Thoracic and Cardiovascular Surgery, 60:757–773 (1970).

Thus, considerable work has been reported in connection with the use of fluorocarbons and fluorocarbon emulsions as oxygen transfer agents and as artificial bloods. The commercial utility for an artificial blood which has all or some of the advantages of natural blood and lacks certain of the disadvantages is significant. Artificial blood could replace natural blood for transfusions, priming of heart-lung machines and other uses. Furthermore, whole blood may carry disease, requires typing and cross matching, has a very short shelf life, and is very expensive to collect, store and administer. In many parts of the world there are no facilities for blood collection and administration. There are situations where the administration of whole blood would be animal life-saving, but it is not possible either because the animal has not been previously typed, because the blood is not available or the blood is not available fast enough. There is, indeed, a long list of needs for artificial blood for animals including research animals, zoo animals and pets.

SUMMARY OF THE INVENTION

This invention is directed to the use of perfluorocyclocarbons and emulsions thereof as artificial bloods and perfusates for organs. Perfluorocyclocarbons have been found to support life as intravascular oxygen-carbon dioxide transport agents and as external respiration media. Emulsions containing emulsified particles of perfluorocyclocarbons have been infused intravenously into experimental animals and function as oxygen-carbon dioxide carrying agents intravascularly. These emulsions have been proven to be useful blood substitutes and experimental animals treated with these emulsions not only survive but can live normal lives after treatment. Furthermore the perfluorocyclocarbons surprisingly are excreted from the animal body through the tissue, particularly the lungs and the skin.

Thus, this invention is predicated in part upon the discovery that perfluorocyclocarbons are capable of administration intravenously as emulsions to perform as oxygen-carbon dioxide carriers supporting animal respiration. It has also been found that these apparently inert compounds tend to accumulate in the animal body, principally in the liver and to a lesser extent in the spleen, and to an even lesser extent in the kidney. Unlike, however, other fluorine-containing organic compounds which are sequestered by the liver and spleen where such other compounds tend to reside indefinitely, the perfluorocyclocarbons leave or are eliminated by the liver or spleen or, more generally, the reticuloendothelial system (RES). The behavior, then, of the perfluorocyclocarbons as gas transport agents and their fate in the animal body is indeed surprising. Among the perfluorocyclocarbons that have exhibited these unique properties of temporary sequestration by the liver or spleen (the RES) and subsequent elimination are perfluoro(methylcyclohexane), perfluoro(1,3-dimethylcyclohexane), perfluoro(decahydronaphthalene) or otherwise called perfluorodecalin, perfluoro(-decahydro-1-methylnaphthalene) and perfluoro(decahydrodimethylnaphthalene). For the purpose of describing these unique reticuloendothelial system properties of the perfluorocyclocarbons, the term "reticuloendothelialphobic" or more simply "RES-phobic" is employed in this description. At least, then, in this respect, the perfluorocyclocarbons as blood substitutes of this invention are to be clearly distinguished from other types of "RES-philic" fluorine-containing organic compounds, for example, perfluoroalkethers, perfluorocycloethers, perfluorotetrahydrofuran, perfluorotributylamine, and the like, which are sequestered and rather indefinitely retained by the liver or spleen of the RES. These RES-philic compounds are characterized by the presence of an atom, such as oxygen or nitrogen, in their structures or by their heterocyclic nature.

The RES-phobic properties of the perfluorocyclocarbons contribute in several important respects to the function of artificial bloods containing such compounds. First, emulsions containing such perfluorocarbons are able to carry out their important function as oxygen-carbon dioxide transport agents efficiently for a reasonable period of time. Then, even though such compounds are temporarily sequestered by the animal body, such compounds are capable of being eliminated from the RES. Also, animals perfused with such artificial blood compounds have demonstrated a normal life pattern thereafter.

In addition to the discovered RES-phobic properties of the perfluorocyclocarbons, it has been found that specific compounds falling within this class leave or are eliminated from the RES, especially the liver or spleen, at different rates. In particular, perfluoro(decahydronaphthalene) has been found to leave the liver or spleen at a significantly faster rate than, for example, perfluoro(decahydro-1-methylnaphthalene) or perfluoro(decahydrodimethylnaphthalene). Tests have shown that amounts of perfluoro(decahydronaphthalene) which have deposited in the liver or spleen of mice will tend to leave in about three weeks in comparison to similar amounts of so deposited perfluoro(decahydro-1-methylnaphthalene) which take as long as five months to leave.

A further finding has been made upon which this invention is also predicated. The perfluorocyclocarbons, after intravenous infusion as an artificial blood, have the unique property of exiting from or being excreted by the animal body by way of the tissue, for example, the lungs and skin. It has been empirically demonstrated in mice that after perfluorocarbocyclic derivatives are intravenously infused perfluorocyclocarbon vapor is excreted from the animal body and its vital organs through the lungs. Furthermore, it has been demonstrated that perfluorocyclocarbon vapor is excreted through the skin of the experimental animals after intravenous infusion of emulsions. In contrast, other perfluorocarbons such as perfluorotrisobutylamine have not been found to possess this unique vapor excretion property.

The fluorocarbons that are useful according to the principles of this invention may be generally termed perfluorocyclocarbons or perfluorocarbocyclic compounds or cyclic perfluorocarbons. The term used predominantly in this description is perfluorocyclocarbons, however, the terms cyclic perfluorocarbons or perfluorocarbocyclic compound are considered alternative expressions. The term "carbocyclic" or "cyclocarbon" means a homo-cyclic compound of carbon, i.e., a ring or rings of carbon atoms. The carbocylcic compound may be momo cyclic as in the case of cyclohexane or bicyclic as in the case of naphthalene or polycyclic as in the case of phenanthracene. The carbon ring can be alkylated with a lower alkyl group or groups such as methyl or ethyl as in the case of perfluoro(methylcyclohexane) or perfluoro(decahydrodimethylnaphthalene). The term "perfluorocyclocarbon", thus, denotes substitution of all hydrogen atoms attached to the carbon atom ring and to any alkyl side groups with fluorine. It is conceivable in the manufacture of such compounds that minor amounts of substantially fluorinated deviatives may be mixed with completely fluorinated cyclic compounds. This is permissible providing substantially fluorinated derivatives do not affect the nature of the perfluorocyclocarbon and its ability to be RES-phobic and relatively non-toxic. The term "fluorocarbon" has been perhpas loosely used in the past to designate gas transfer compounds, however, such compounds have been characterized by the presence of other atoms other than carbon and fluorine, such as oxygen or nitrogen, as mentioned above which tend to be RES-philic. The following Table I represents specific examples of perfluorocyclocarbons suitable for use in the employment of this invention along with their empirical formulas, and other properties, including availability under trade names.

TABLE I

| TRADE NAME | CHEMICAL NAME | EMPIRICAL FORMULA | MOLECULAR WEIGHT | BOILING POINT °C | VAPOR PRESSURE AT 37.5°C torr | SPECIFIC GRAVITY |
|---|---|---|---|---|---|---|
| Imperial* PP9 | perfluoro(1-methyl-decalin) | $C_{11}F_{20}$ | 512 | 160 | 5.2 | 1.972 |
| Imperial PP2 | perfluoro(methyl-cyclohexane) | $C_7F_{14}$ | 350 | 76 | 180 | 1.788 |
| Imperial PP3 | perfluoro(1,3-dimethyl-cyclohexane) | $C_8F_{16}$ | 400 | 102 | 62 | 1.828 |
| Imperial PP5 | perfluorodecalin perfluorodimethyl-decalin | $C_{10}F_{18}$ $C_{12}F_{22}$ | 462 562 | 142 | 13.6 | 1.946 |

*Imperial Smelting Corporation, Ltd., England

The above perfluorocyclocarbons are capable of being synthesized by either well known chemical or electrochemical processes. The chemical processes yield fairly pure substances of known structure, having well defined boiling points. Whereas the electrochemical processes tend to yield a mixture of isomers, but the liquids have well defined boiling points. The above perfluorocyclocarbons all have in common a high solubility for oxygen and carbon dioxide, and are suitable as oxygen carrying liquids for supporting respiration of an animal, i.e., a warm-blooded animal or mammalian subject. A particular perfluorocyclocarbon or a mixture of perfluorocyclocarbons falling within the family of perfluorocyclocarbons exemplified by the above derivatives may be used according to the principles of my invention. One main property generic to the preference of the perfluorocyclocarbons according to this invention over other fluorine-containing organic compounds is their chemical structure which renders them RES-phobic. This is significant, as mentioned above, because such compounds even though they may eventually travel to and deposit in the liver, for example, upon intravenous infussion into the animal body, they have the capability of escaping the liver (RES) rather than becoming fixed indefinitely. While each of the above specific cyclic compounds qualifies on the basis of RES-phobic structure, there is another property associated with this class of compounds that is preferentially utilized in the preparation of artificial blood according to the principles of this invention. A perfluorocyclocarbon, or a mixture of perfluorocyclocarbons, is preferably employed having a vapor pressure within the range of about 1 to about 50 torr at about 37.5°C. Such compounds or mixtures are RES-phobic and have the capability to leave or escape the RES expediently without causing adverse gas collection in the tissue of the animal body. To illustrate this concept, a half mixture of perfluoro(1,3-dimethylcyclohexane) having a vapor pressure of 62 torr at 37.8°C and perfluorodecalin having a vapor pressure of 13.6 torr at 37.5°C is emulsion-formulated according to this invention. The vapor pressure of the emulsified mixture of perfluorocyclocarbon liquids is about 38 torr at 37.5°C. Upon intravenous infusion of the resulting emulsion into mice, as an artificial blood, the amounts of fluorocarbon accumulated in the liver, for example, are reduced from as much as about 40% of the total infused amount to 0 in a period of about 3 weeks. Therefore, for the purpose of maintaining a safe gradient in vapor pressure, emulsions are infused having perfluorocyclocarbons or mixtures thereof which possess vapor pressures especially within the mid-range of about 20–40 torr, within the overall range of 1–50 torr. In the event that emulsions containing carbocyclic fluorocarbons or mixtures are used where such compounds have vapor pressures above 50 torr, then breathing the vapor of the same or similar fluorocarbon that is injected balances the gas pressures in the lungs so that gas embolism does not occur. Without this vapor breathing, the partial pressure of the fluorocarbon in the lungs is, unlike most other gases and vapors, extremely low apparently due primarily to the poor solubility of the fluorocarbon in blood. Hence, the total gas pressure in the blood exceeds total alveolar pressure, and gas embolism results. Breathing the vapor can prevent this for hours. If the animal is removed from the vapor and placed on room air before a potentially lethal amount of a high vapor pressure (say about 100–200 torr at 37.5°C) fluorocarbon gas has left the blood stream, death results in a short time. However, the critical necessity for breathing vapor upon intravenous infusion of emulsions can be eliminated by employing perfluorocyclocarbons having vapor pressures below about 40–50 torr at about 37.5°C.

The perfluorocyclocarbons for use as artificial blood are prepared in emulsion form. Water, ions, glucose, amino acids, proteins, and most organic substances are virtually insoluble in the fluorocarbon liquids. Thus, the way in which the desirable oxygen transport characteristic of the fluorocarbon is utilized herein is by emulsifying the fluorocarbons in an aqueous phase containing the desired salts, glucose, and the like, together with a surfactant which is necessary as an emulsifying agent. Theoretically, perhaps, one could use a water-in-oil emulsion, but it is presently preferred to use oil-in-water emulsions. Where the fluorocarbon may be a solid, it can be dispersed or suspended in the aqueous phase. The fluorocarbon emulsions are prepared on the volume basis. For example, to make a 10% fluorocarbon emulsion, 10 cc of fluorocarbon liquid are placed into a 100 cc cylinder then 90 cc of the aqueous phase are added. An emulsifying agent, for example, polyoxyethylene-polyoxypropylene copolymer having a molecular weight of about 8200 (Pluronic F68) is pre-mixed in the aqueous phase along with 0.6% by weight concentration of sodium chloride (as Ringer solution diluted to half strength with water). The mixture of water, fluorocarbon, sodium chloride and emulsifier is poured into Waring Blendor and the Blendor is turned on for a very short time, less than a minute. The Waring blendor has been modified so that the vortex in the center is eliminated otherwise one obtains too much foam. The purpose of this blending is to make a very coarse emulsion so that the fluorocarbon is more or less suspended in the aqueous phase. This coarse emulsion is then further emulsified in two preferred ways. One way employs a homogenizer, e.g., a Gaulin Model 15M Homogenizer, maximum capacity 15 gph and continuous operating pressure of 8,000 psi. The second way employs a sonicator, e.g., a Branson Model LS–75, which when tuned the ammeter usually is between 4 and 8 amperes. In either technique, the emulsions are pumped from a water jacketed stainless steel container with a Sigma Motor Pump Model T6S at 100 cc/min., using ⅜ ID polyurethane tubing, to a water-jacketed flow-through cell attached to the homogenizer or sonicator, then through a heat exchanger, Travenol Model 5M0331, and back to the container. A magnetic stirring bar is used in the container to keep the emulsion well mixed. Because of the large amount of power applied continuously by the homogenizer or sonicator for long periods of time (about 3 hours), it is very difficult to prevent over-heating the emulsions. A refrigerated recirculating bath is used to pump coolant at −2°C to the flow through cell, the container and heat exchanger. This cooling keeps the emulsion temperature below 10°C. The fluorocarbon emulsion is circulated in the Gaulin Homogenizer or Branson Sonicator until optical density reaches a stable and low value. The optical density can be continuously recorded in flow through cells having various optical paths, as emulsification proceeds. It can be seen that there is a wide variation in the point at which the fluorocarbon optical density plateaus, but that it does plateau in nearly every instance. In general, the finer the particle, the lower the optical density or the more transparent the emulsion. After homogenization or sonication, the emulsions are centrifuged in 350 ml bottles for 60 minutes to remove the population of large particles, to determine if separation would occur, and to remove the metal dust discharged by the titanium sonicator horns. Also, in the case of the sonication technique, an OH anionic exchanger is used to remove F ion concentration in ppm's from the emulsion. The fluorocarbon emulsion is then transferred to clean bottles and either used immediately or stored in the refrigerator until needed. The emulsions are more stable when kept cold and refrigeration is used to retard bacterial growth.

The ion exchange procedure for removing fluoride ion from the ultrasonicated emulsions involves analysis with the Orion F electrode to detect presence of the F ion which has been found to be generated by sonication. The amounts are usually very small, i.e., in the low ppm's on the order of about 2–100 or more ppm's. Then, the emulsions are centrifuged at 3000g. for 20 minutes to remove titanium dust, etc., as mentioned above. The emulsion is then passed through an ion exchange resin, e.g., a polystyrene alkyl quarternary amine (hydrolyzed form), sold under the name REXYN I201, in a column of 10×190 mm., at a rate of 20–30 drops per minute. Reanalysis for F ion confirms removal.

The appearance of an emulsion reveals much about the predominant particle size with a relationship like this:

| Particle Size | Appearance | Absorbance |
|---|---|---|
| 1 – 10 μ | Milky White | 100 |
| 0.1 – 1 μ | Blue White | 10 |
| 0.01 – 0.1 μ | Semi-transparent | 1 |
| 0.001 – 0.01 μ | Transparent | 0.1 |

The milky white emulsions settle to give a clear layer; transparent emulsions do not settle. Semi-transparent emulsions dry to form a shiny film. Each fluorocarbon has its own optical density curve upon homogenization and there is a reproducible plateau for each. This is very important because it is possible to make emulsions in a reproducible way from day to day. If the amount of F68 surfactant is varied, say from 1 to 20% by volume, but the fluorocarbon held constant, the absorbance of the emulsion decreases and, hence, the particle size decreases. If one keeps the surfactant constant, but changes the amount of fluorocarbon, say from 1 to 30% by volume, the absorbance increases. Suffice it to say that it is preferred to make emulsions that are transparent or semi-transparent, i.e., having an average particle size within the range of about 0.001 to about 0.1 μ because they tend to be more stable and have been found capable of safe administration. If the emulsion particle is about 100 μ, it probably cannot be safely used. Particle sizes up to 5 μ can be employed with the safe upper limit of particle size being governed by the particle ability to be safely transported in the animal veins, arteries and capillaries. For example, 10% by volume fluorocarbon emulsions of PP9 and PP5 with 5% by volume of F68 have optical density plateaus of about 0.25 and 0.4 at 550 mμ, are transparent in appearance and have been found satisfactory for intravenous infusion. The concentration of these and other perfluorocyclocarbons can be increased from about 5% to about 30% by volume to closely approximate the oxygen carrying property of whole blood. Of course, within the teaching of this description the amount of emulsifier and fluorocarbon in an emulsion can be varied within the skill of the art to provide stable emulsions for intravenous infusion and to obtain satisfactory results, especially in view of the examples which follow.

In the preparation of perfluorocyclocarbon emulsions just described, the block polymer polyols, sold under Wyandottes' trademark, "Pluronics", are used as emulsifying agents. One advantage of the perfluorocyclocarbons used in this invention is their ease of emulsifiability which allows for use of small amounts of emulsifier. The most commonly used emulsifying agent is Pluronic F68, having a molecular weight of about 8,000 and available in large quantities. This surfactant is an efficient emulsifying agent and it has been used in the administration of fat emulsions. F68 is non-hemolytic, non-ionic and it has been used to stabilize the erythrocytes against mechanical hemolysis. In small amounts, F68 is satisfactory and it is preferred to use about 5 to about 10% by weight concentrations in Ringer's lactate solution. For toxicity studies on F68, reference is made to Clark, "Physiology of Synthetic Blood", supra. Therefore, at present, it is preferable to use Pluronic F68 in accordance with this invention. Other types of surface active agents may be used. One of the main criterions in selecting the surface active agent for infusion into whole blood is, of course, that it does not damage the blood. There are very few, if any, cationic or anionic surfactants which do not cause hemolysis when mixed with the blood. The non-ionic surfactants, which do not cause hemolysis, are then the most likely candidates for suitable use and include naturally occurring surfactants such as albumin, phospholipid, glycerol, dextrans and gelatin.

In addition to the perfluorocyclocarbon and the surfact active agent in the emulsion, it is preferred, but not essential, that the emulsion include an ionic component. In one instance, where a fluorocarbon emulsion is being infused intravenously into whole blood, it is not essential that an ionic component be added to the emulsion prior to introduction because the emulsion mixes with the ionic whole blood. Because most of the surfactants have sizeable osmotic activity, some consideration has to be given to juggling the ionic composition so as not to have a hypertonic solution. Generally speaking, in the preparation of emulsions, there is added approximately 0.6% by weight of sodium chloride since this is a concentration which can be infused rather rapidly without causing hemolysis. Ringer solution diluted to half strength with water is suitably used.

Figure 1:
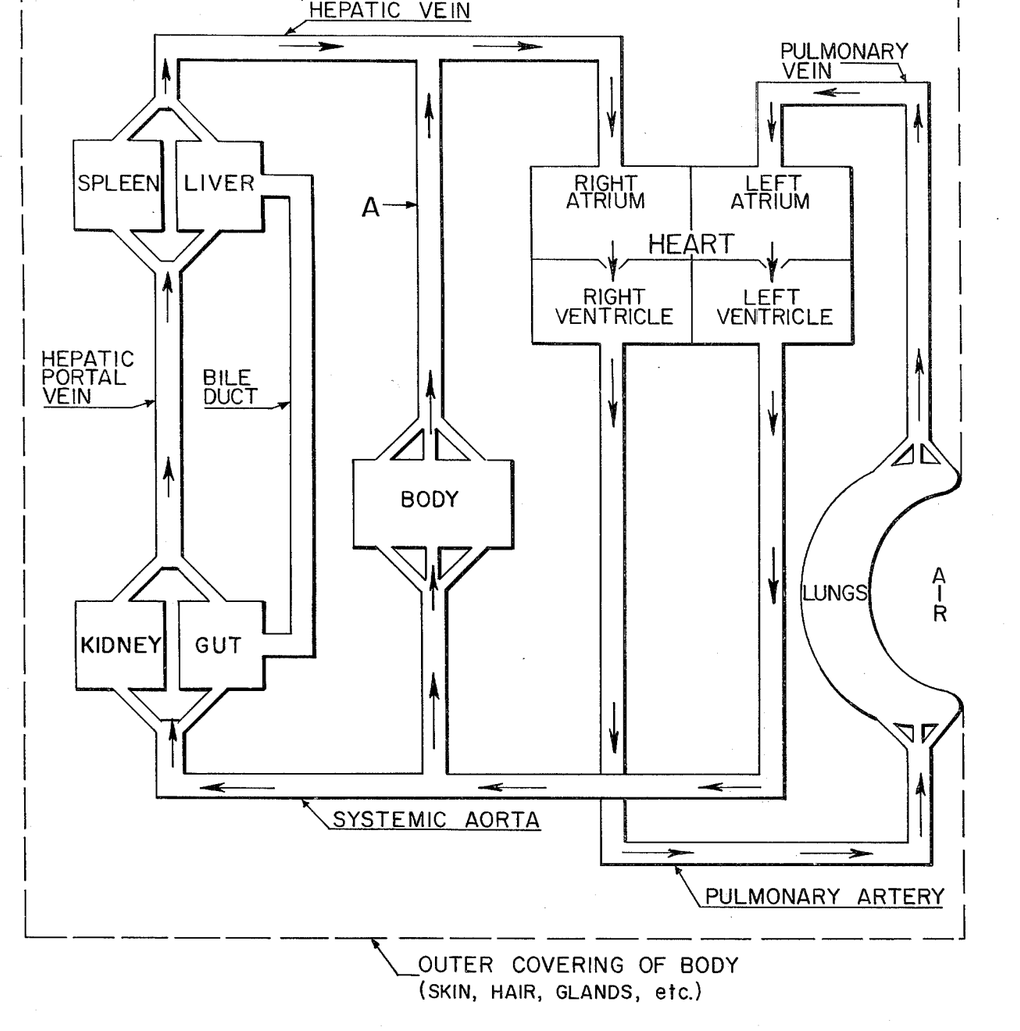

The invention, its principles, preferred mode of operation and objectives, will be further understood in view of the following examples with reference to the drawing which is a diagrammatic illustration of a cardiovascular system of an experimental animal, i.e., a mouse.

The drawing illustrates the animal heart, lungs, liver, spleen, gut (intestine) and kidney functions, with the main connecting veins and arteries in the cardiovascular system of the body. The blood flow and direction throughout the system is shown by arrows. The interior of lungs are shown in communication with the external environment (air). The dotted line represents the outer covering of the body, i.e., skin, hair, glands, etc., which protects the underlying tissues. Briefly, blood is pumped by the heart through the systemic aorta and the greater part then courses through arteries which terminate in capillaries in various parts of the body. The blood returns to the heart through veins. A lesser amount of blood is pumped to the gut (intestine), kideny and, through the hepatic artery (not shown), to the liver. The liver receives a small amount of its blood supply directly from the heat through the hepatic artery, but the larger part is received from the wall of the gut through the portal vein. The portal vein supplies blood with its products of digestion and other substances absorbed through the intestinal mucosa. The bile duct connects the liver to the intestine carrying the bile secreted by the liver cells to the intestine. The hepatic vein carries the venous blood as it returns from the intestine to the heart where it is pumped through the right ventricle via the pulmonary artery to the lungs. From the lungs, the blood flows back through the pulmonary vein and through the left ventricle of the heart again to the systemic artery.

The veins from all the organs gradually join together like tributaries of a river to form two streams, one from the upper part of the body and one from the lower, to join in the right atrium, from which it is pumped, largely by the right ventricle into the pulmonary artery and through the lungs. In the lungs oxygen is added to the venous blood and carbon dioxide is removed. In this process, the color of the blood changes from a blush-red to a very bright red. All the veins of the lung join together to form the pulmonary vein. The pulmonary vein, therefore, contains well mixed oxygenated or "arterialized" blood draining from the lungs. The pulmonary artery, on the other hand, contains well mixed venous blood draining from all parts of the body. All the other veins of the body contain venous blood and all the other arteries contain arterial blood.

The average oxygen pressure (tension), commonly written $pO_2$, in venous blood of an animal breathing air is about 70 torr. The average arterial $pO_2$ is about 90 torr. During oxygen breathing, the venous $pO_2$ perhaps will increase to about 80 torr and the arterial $pO_2$ to about 600 torr. There is, of course, variation among animals, depending upon their age, extent of disease, depth of respiration, level of anesthesia, cardiac output, and many factors, but outside of hyperbaric oxygen treatment the $pO_2$ of mixed venous blood almost never exceeds 100 torr. When fluorocarbon emulsions are infused the $pO_2$ usually increases to 300 and cannot be distinguished from arterial blood from appearance alone; it must be measured. The most common way to measure blood $pO_2$ is with a membrane-covered polarographic electrode (The Clark Oxygen electrode). The rise in venous oxygen tension is the function of the amount of fluorocarbon emulsion added to the blood stream. The more the fluorocarbon, generally speaking, the higher the $pO_2$ and values normally reach 300 torr in the dog. Following this dramatic increase, the $pO_2$ gradually falls and returns to normal in about two hours. This decrease is not due to the loss of ability of the fluorocarbon to carry oxygen, but is due to a decrease in cardiac output. This decrease appears to be a natural response to the increased oxygenation of body tissue. It can be demonstrated, for example, by measurements with a brain polarographic oxygen cathode. Thus, the artificial blood preparations of this invention can be tested for their ability to carry oxygen by the two methods given above, namely, the increase in mixed venous $pO_2$ and the increase in oxygen cathodic current.

In view of this rather brief simple description of the cardiovascular system, it will be understood that the invention can be practiced in the case of intravascular administration of perfluorocyclocarbon emulsion by infusing intravenously the emulsion into a vein returning to the heart. A point of infusion is shown at "A" of the drawing. The fluorocarbon acts as an oxygen-carbon dioxide transport agent after infusion and, upon being pumped by the heart to the lungs, the respiratory exchange of oxygen-carbon dioxide is effected between the circulating blood and the environment (air). The oxygenated blood is then circulated by the heart throughout the internal respiratory system as described above. As will be developed in more detail hereinafter, the infused perfluorocyclocarbons are also excreted through the outer covering of the body and lungs.

GENERAL PROCEDURES

Certain general procedures have been employed in the specific examples which follow. These include preparation and maintenance of mice and fluorocarbon emulsion infusion procedure; sodium biphenyl analytical determination of fluorocarbon present in tissue and in blood; and measurement of the excretions of fluorocarbon vapor.

I. Preparation and Maintenance of Mice and Fluorocarbon Emulsion Infusion Procedure Female Swiss Albino mice, from Laboratory Supply Co., are weighed to the nearest ½ gram and contained in a plastic holder perfused with humidified 100% $O_2$, exposing the tail. Tail veins are expanded by wrapping the tail with a wet 40°C gauze for 10 seconds. The lateral tail veins only are used. After the infusion, the tail is swabbed with 70% ethanol and marked for identification. Animals are kept in a clean cage in groups of ten, and fed ad lib for the duration of their observation after which they are sacrificed. Emulsions are infused using a Sage Instrument syringe pump Model 355 at 2 cc/min., and a glass 10 cc multifit syringe connected via 12 inches of 18 gauge Kel-F tubing to a 26 gauge, ½ inch, thin wall needle. Pressure is monitored with a Statham P23Gb strain gauge and a Med-Science Electronics A-V pressure monitor attached through a T-connection to the tubing to assure that the needle is in the vein and the emulsion has not infiltrated. The pump is controlled by a Kraft Apparatus Rapid Reset Timer. The dose delivered is measured in seconds of infusion to the nearest ½ second.

II. Sodium Biphenyl Analytical Determination

The procedure for analyzing fluorocarbon in tissues (liver and spleen) and in blood is based on the decomposition of the organic fluorine compounds with sodium biphenyl reagent followed with dilution and potentiometric measurement of fluoride with an Orion Fluoride electrode.

A. Apparatus—The fluoride ion activity electrodes (Model 94–01A and the single junction reference Model 90–01; Combination Model No. 96–09–00) were supplied by Orion Research, Inc. The electrodes were stored in water containing about 1 ppm $F^-$. Model No. 90–00–01 (Orion, Inc.) filling solution was used for the reference electrode. Radiometer Model 22 pH meter with expanded scale was used to read millivolts. Additional apparatus consists of the following: 10 $\mu l$ disposable pipettes (Clay Adams, tc 10 $\mu l$, ±½% accuracy); 15 cc polypropylene conical centrifuge tubes (Nalgene); polyethylene hollow caps (size 0); 50 cc Tipet Head with 1000 cc Erlenmeyer Flask (Thomas Scientific Co., TD 50 cc, ±2% accuracy); 100 cc polypropylene beakers (Tri-pour disposable beakers, Sherwood Medical Industries, Inc.); 12 ml disposable syringes (at least 6.5 cm in length); Tissue Homogenizer with variable speed motor and chuck drive (Thomas Scientific); teflon pestle and glass grinding vessel to accompany tissue homogenizer; Vortex Genie mixer set at speed 5 (Scientific Industries).

B. Reagents—The sodium biphenyl reagent (Southwestern Analytical Chemicals, Inc.) was supplied in 15 ml vials. Each vial contains 15–18 meq of sodium biphenyl dissolved in 1,2-dimethoxyethane. On storage in cold, the reagent loses about 5% strength per month.

All reagents were analytical grade. The buffer used in the analysis of $F^-$ following decomposition of the organic F compound was prepared as follows: glacial acetic acid, 57 ml; sodium nitrate, 58 grams; CDTA (trans-1,2-diaminocyclohexane-N,N,N,',N'-tetracetic acid monohydrate, Aldrich Chemical Company), 4 grams; sodium hydroxide pellets, about 35 grams; distilled water, fill container to 1 liter; adjust to pH 5.8 with sodium hydroxide. The buffer is prepared in 12 liter batches and is stored in a glass container. Neefus, et. al. (American Industrial Hygiene Association Journal 31, 96–99 (1970)) discussed the importance of using the above TISAB buffer (total ionic strength adjustment buffer) at a pH greater than 5.14 and less than 6.0 to prevent the presence of undissociated HF at an acid pH which gives false low millivolt readings and of OH at basic pH which gives false high millivolt readings. CDTA is used as a complexing agent for calcium and magnesium.

C. Procedure of Analysis—The following procedure can be used in the analyses of fluorocarbon present in blood, animal tissues, and emulsions (used as artificial blood). Animal tissues are first prepared by weighing the organ in air and in water in order to calculate the density of the organ:

$$\text{density} = \frac{\text{weight of the organ dry}}{\text{weight of organ dry-weight of organ in water}}$$

The weight of the tissue sample is then converted to volume of sample:

$$\text{volume of sample} = \frac{\text{weight of sample}}{\text{density of organ}}$$

Using this volume, the tissue is diluted 1:3 (or 1:5 in the case of very small organs such as mouse spleen) with 1% Pluronic F68 solution in water. Homogenates are prepared using a glass container and Teflon pestle with the tissue homogenizer.

The analysis can be performed serially and in large number (approximately 10 analyses per hour). The 15 ml conical centrifuge tubes are arranged in a test tube tray (in duplicate for each sample to be analyzed) and 2 drops of 1,2-dimethoxyethane are put into each tube. The 1,2-dimethoxyethane (solvent used for biphenyl reagent) serves as a solvent for receiving the blood or tissue samples which dry rapidly in the small quantities used. Recovery of fluorocarbon is greatly decreased without the use of this solvent. The test tubes are labelled and capped with number 0 hollow caps. The use of caps helps to decrease the presence in the test tubes of atmospheric water which react with the sodium biphenyl reagent. Using the 10 μliter disposable pipettes for each sample, 10 μl of the sample (blood, tissue homogenate, or emulsion) is put into the test tubes. The 12 ml syringe is filled with the sodium biphenyl reagent. The plastic tip is used in order to immerse the syringe into the sodium biphenyl container. All of the air should be removed from the syringe before continuing. The sodium biphenyl (1.8 ml) is delivered into each centrifuge tube and the contents are mixed for 15 seconds using the vortex mixture. The reaction of the sodium with the fluorocarbon is complete within a few seconds. The 100 cc polypropylene beakers are labelled for each sample. Using the 50 cc automatic pipette, 50 cc of TISAB buffer is poured into the beakers. The Na biphenyl in the centrifuge tubes is mixed for about 10 seconds. About 5 cc of the buffer is poured from the beaker into the test tube and the contents are mixed until all of the biphenyl has reacted. The contents of the test tube are poured into the beaker and the procedure is repeated twice more to make sure that the test tube is rinsed well with the buffer as well as to mix the reacted biphenyl with the buffer. A white compound (biphenyl) forms in the beakers at this point. The volumes of sample, sodium biphenyl, and buffer given in this procedure are designed to allow complete combustion of fluorocarbon by the sodium bipheynl while still using the minimum amount of sodium biphenyl. Large quantities of sodium biphenyl cause a basic pH when the reaction products are mixed with the pH 5.8 buffer.

The entire beaker is placed under the fluoride ion selective electrode to measure the free fluoride content. An alarm clock is set for 5 minutes and the technician can proceed with dilution of the next sample while the fluoride electrode stabilizes. Free fluoride is read in terms of millivolts from the pH meter and the percent fluorocarbon in the sample is calculated using a calibration curve for the particular fluorocarbon being analyzed.

D. Calibration Curves—A fluorocarbon emulsion with a known amount of fluorocarbon (as calculated by density) is selected. The emulsion is diluted 1:10 and 1:100 in order to provide 3 standard points on the calibration curve. For example, fluorocarbon X will have millivolt readings at 10% (the percent fluorocarbon used in most of the emulsions prepared in the examples which follow), at 1% (1:10 dilution). According to the Nernst equation, a 59 millivolt change should occur between 1:10 dilutions at room temperature. In actual practice, though, the millivolt increments vary from 57 to 60 millivolts. This difference may be attributed to percent error inherent in the method of analysis (i.e., the 50 cc automatic pipette has an accuracy of ±2%). Typical analytical results with different samples are as follows:

| SAMPLE | % FLUORINE Theoretical | Found |
|---|---|---|
| Perfluorotributylamine liquid | 78.0 | 80.4 |
| Perfluorobutyltetrahydrofuran emulsion | 74.0 | 70.6 |
| Perfluoro (1,4-diisopropoxybutane) liquid | 73.0 | 71.4 |
| 2H tetradecafluoro-5-(trifluoromethyl)-3,6-dioxanonane emulsion | 71.4 | 73.2 |
| 4-F-benzoic acid | 13.56 | 13.4 |

III. Measurement of the Excretion of Fluorocarbon Vapor

Gas chromatograph Series 2700 Varian having an electron capture detector, a column 12 feet ⅛inch, 10% SE-30 Chromosorb 60/80, at a temperature of 80°C, was employed to measure fluorocarbon vapor. Mice are placed inside a 225 ml glass bottle and the opening sealed with heavy aluminum foil. 10 to 100 μl samples of air from inside the bottle are taken at 1 minute and 3 minutes and analyzed by the gas chromatograph. Calibration of the gas chromatograph was accomplished by injecting 0.5, 1, 2 or 5 μl of the fluorocarbon diluted with hexane using a Hamilton syringe.

The following examples illustrate the preparation of emulsions and infusion of mice (all fluorocarbon percents are by volume and other percents are by weight).

EXAMPLE 1

A 9.4% perfluorodecalin, i.e., PP5, emulsion containing 5% F68 was prepared by the above described sonication technique with 0.6% concentration of sodium chloride. The emulsion was passed through an OH anionic exchange resin to render it $F^-$ free. The emulsion was nearly transparent in appearance. Two hundred mice were each intravenously infused with this emulsion according to the general technique at a dose of 100 cc/kg of body weight.

EXAMPLE 2

A 10.1% perfluorodecalin (PP5) emulsion containing 5% F68 was prepared by the Gaulin homogenization technique with an added concentration of 0.6% NaCl. The emulsion was nearly transparent in appearance. Two hundred mice were each intravenously infused with this emulsion according to the general technique at a dose of 100 cc/kg of body weight.

EXAMPLE 3

The precedures of Example 2 were repeated except that an 8.2% perfluorodecahydro-1-methylnaphthalene (i.e., PP9 emulsion) was prepared and infused into two hundred mice.

EXAMPLE 4

The procedures of Example 1 were repeated except that a 9.4% PP9 emulsion was prepared and infused into two hundred mice.

EXAMPLE 5

The procedures of Example 2 were repeated except that a 10% PP9 emulsion was prepared and infused into two hundred mice.

EXAMPLE 6

The procedures of Example 1 were repeated except that a 9.3% perfluoro (1,8-diisopropoxyoctane), i.e., P11D emulsion was prepared and infused into two hundred mice.

EXAMPLE 7

The procedures of Example 1 were repeated except that a 10% perfluorocarbon emulsion of a mixture of 2.5% each of PP9; P11D; 2H-Eicosafluoro-5, 8, 11-tris (trifluoromethyl)-3, 6, 9, 12-tetraoxapentadecane, i.e., (E-4 by duPont); and FC47 (perfluorotributylamine) was prepared and infused into two hundred mice.

EXAMPLE 8

The procedures of Example 1 were repeated except that a 9.4% perfluorodimethyldecalin (hereinafter termed PFDMD) was prepared and infused into two hundred mice.

EXAMPLE 9

The procedures of Example 1 were repeated except that a 10% emulsion of a mixture of 5% each of PP5 and perfluoro (1,3-dimethylcyclohexane), i.e., PP3, was prepared and 50 cc/kg of body weight was infused into two hundred mice.

A main finding upon infusion of dogs or cats has been that normal blood gases and pH can be maintained throughout the infusion of dosages on the order of about 50 cc/kg of 5–30% fluorocarbon emulsions. In general, during the infusion of the emulsion in these dogs or cats cases, the venous $pO_2$ gradually increases, and usually reaches about 300 torr or more. This indicates that the oxygen transport is being carried out entirely by the fluorocarbon emulsion since oxygen would not be released from the red cells until the $pO_2$ is around 100. The dog or cat venous $pO_2$ returns to normal in about two hours, and analysis shows that the fluorocarbon content is still high.

In accordance with these venous $pO_2$ increases, the relative tissue $pO_2$'s have been measured in the brain of a cat, and this also demonstrates the oxygen carrying ability of these emulsions in the animal. Also, Examples 1–9 and similar mice data demonstrate the utility of these emulsions as oxygen-carbon dioxide transport agents or artificial bloods in mice upon the administration of 50–100 cc/kg. These amounts equal or exceed the entire blood volume of the mouse. Generally, dosages on the order of 50–200 cc/kg can be employed for infusion in mice, having about 5–30% by volume of fluorocarbon present in the emulsion. Almost all of the mice survived infusion of Examples 1–9 and many months thereafter those remaining under observation are in apparent good health. $MLD_{50}$'s for the perfluorocyclocarbon emulsions of Examples 1–9 demonstrate that such emulsions are no more toxic than intravenous solutions ordinarily used in the clinic, for example, 5% glucose. $MLD_{50}$'s have been ascertained and in general are on an order of magnitude greater than 200 cc/kg. For a more detailed treatment on oxygen transport mechanisms of fluorocarbons in general and toxicity studies reference is made to my papers, "The Physiology of Synthetic Blood" and "The Physiological Effects of Artificial Blood made From Inert Organic Oxygen Solvents", Clark, et al., *Alabama Journal of Medical Science*, 9:16–29 (dated January, 1972; published in about May, 1972).

In order to demonstrate the fate of the perfluorocyclocarbons in the body, particularly the RES, and to show the RES-phobic characteristics of such perfluorocyclocarbons, groups of mice from Examples 1–9 were sacrificed at timed intervals. For this study, the mice from each of the examples were usually sacrificed in groups of six, their livers and spleens biopsied, and the percent of infused fluorocarbon dose left in the tissue was determined by the sodium biphenyl technique described above. The average percentages of infused fluorocarbon doses left in the livers and spleens for all mice in the group sacrificed (after approximately 1 hour, 1 day, etc., through 5 months) are recorded in the Tables II and III as follows. In those instances where two percentages are recorded in one time block, two groups of mice were sacrificed, and the average percentage for each group is reported. Where the time is left blank, no determinations were made.

TABLE II

| MICE OF EXAMPLE | FLUOROCARBON EMULSION | PERCENT OF INFUSED DOSE LEFT IN LIVER | | | | | | | | | |
|---|---|---|---|---|---|---|---|---|---|---|---|
| | | 1 HOUR | 1 DAY | 5 DAYS | 1 WEEK | 2 WEEKS | 3 WEEKS | 1 MONTHS | 2 MONTHS | 3 MONTHS | 5 MONTHS |
| 1 | PP5 | 19.7 | 35.2 | 37.9 | | 3.8 | 12.7* | 3.3 | 1.7 | | 2.3 |
| 2 | PP5 | | | | 27.1 | 3.9 | 1.03 | | | | |
| 3 | PP9 | 16.1 | 34.2 | 38.2 | | | | 21.9 | | 4.1 | |
| 4 | PP9 | | 21.1 | 33.0 | | | | 28.4 | 13.5 | | 1.3 |
| 5 | PP9 | | | | 31.0 | 25.8 | 23.4 | | | | |
| 6 | P11D Mixture PP9 | 10.9 | 18.2 | 43.3 | | | | 36.5 | 36.7 | | 33.9 |
| 7 | P11D, E-4 and FC-47 | 25.7 | 19.6 | 40.7 | | 34.5 | | 26.4 | 33.6 | | 23.9 |
| 8 | PFDMD Mixture | 24.8 | 32.5 | 40.0 | | 47.5 | 34.8 | 27.2 | | | |
| 9 | PP3 and PP5 | 24.5 | 42.6 | 35.1 | | 6.2 | 0 | | | | |

*value reported considered questionable

TABLE III

| MICE OF EXAMPLE | FLUOROCARBON EMULSION | PERCENT OF INFUSED DOSE LEFT IN SPLEEN | | | | | | | | | |
|---|---|---|---|---|---|---|---|---|---|---|---|
| | | 1 HOUR | 1 DAY | 5 DAYS | 1 WEEK | 2 WEEKS | 3 WEEKS | 1 MONTHS | 2 MONTHS | 3 MONTH | 5 MONTH |
| 1 | PP5 | 1.1 | 6.2 | 7.8 | | 2.7 | 9.7* | 1.7 | 0.3 | | 0.4 |
| 2 | PP5 | | | | 7.3 | 2.0 | 0.23 | | | | |
| 3 | PP9 | 0.77 | 6.2 | 6.1 | | | | 5.0 | | 0.8 | |
| 4 | PP9 | | 4.3 | 4.5 | | | | 7.1 | 3.0 | | 0.3 |
| 5 | PP9 | | | | 7.7 | 7.0 | 6.8 | | | | |
| 6 | P11D Mixture PP9 | 0.46 | 2.2 | 6.25 | | | | 6.0 | 6.1 | | 5.0 |
| 7 | P11D, E-4 and FC-47 | 1.5 | 2.2 | 8.1 | | 7.4 | | 6.8 | 6.3 | | 5.4 |
| 8 | PFDMD Mixture | 0.9 | 4.6 | 6.6 | | 6.2 | 8.0 | 4.1 | | | |
| 9 | PP3 and PP5 | 2.0 | 5.2 | 6.5 | | 3.4 | 0 | | | | |

*value reported considered questionable

Several observations can be made when the data of Table II and Table III are studied. First of all, infused fluorocarbons are found in the liver and spleen within 1 hour and the amounts increase over the next five days. By the end of five days nearly 50% of the infused dose for all fluorocarbons has been sequestered by the liver and spleen. The sequestration of the perfluorocyclocarbons as a group (PP5, PP9, PFDMD and PP3–P-P5) is temporary in comparison to the non-carbocyclic perfluorocarbons as a group (Example 6 and most of Example 7). In particular, PP5 leaves at a much faster rate than the other perfluorocyclocarbons individually (comparing Example 2 with Examples 3, 4, 5 and 8). The mixture, however, of PP3 and PP5 leaves completely within 3 weeks in comparison to any of the emulsions tested. The perfluorocyclocarbons as blood substitutes are demonstrated by this data to be RES-phobic in that they are only temporarily sequestered by the liver and spleen, and are found to leave or are eliminated by the RES. In contrast, the other fluorocarbons tested are found in the liver and spleen and there remain rather indefinitely as Examples 7 and 8 demonstrate. In this sense, the P11D, E-4, and FC-47 are RES-philic.

Other data has shown that perfluoro (1,4-diisopropoxybutane), Allied P1D, having a vapor pressure of about 13 torr at 37.5°C, quite similar to the vapor pressure of PP5, resides in the mouse liver and spleen rather indefinitely for periods of up to at least 1 year without significant diminution in amount.

Present data on mice demonstrates by analysis that after about five days about 42% of the injected perfluorocyclocarbon (PP5) dose is in the liver, a few percent in the spleen, and very small amounts in the other organs of the body and in the organ-free body which is called the carcass. Accurate data for these other organs and carcass is not presently available. It appears, nonetheless, that kidneys, lungs, and intestine, including the carcass, probably contain fluorocarbon on order of magnitude lower than the liver or the spleen. Mice tests conducted for PP5 after 5 days (when fluorocarbon blood level is essentially zero) shows that about 67% of the total infused amount can be accounted for in the total mouse body. The precise histological location of this fluorocarbon is not known; it may be even in the lungs, for example, because of the small amount of RES activity in this organ. Furthermore, factors other than RES activity may contribute to the presence of fluorocarbon in other organs or the organ-free body.

For the purpose of demonstrating other discoveries upon which this invention is also predicated, the following examples were performed. In these examples, the mode of excretion of perfluorocyclocarbon vapor through the tissue of the experimental mouse to the external environment is shown, principally by way of the lungs and the skin.

EXAMPLE 10

A 10% PP5 emulsion was prepared in the manner described in Example 1. Mice were infused with this emulsion at a dose of 100 cc/kg in accordance with the general technique. The total injected fluorocarbon was 200 μl per mouse. Two mice, mouse A and mouse B, were tested for excretion of fluorocarbon vapor according to the GC technique described above. Daily vapor samples were taken after 3 minutes of residence in the bottle for each mouse and the amounts of cis and trans isomers of PP5 in nanoliters per liter of air by GC analyses are reported in Table IV.

EXAMPLE 11

A 10% PP9 emulsion was prepared in the manner described in Example 1. Mice were infused with this emulsion as in example 10 and GC analyses were similarly performed for comparison with PP5. The results are reported in Table IV. It is to be noted that the PP9 used contained some PP5 as determined by the GC apparatus. Three mice, A, B and C were tested.

EXAMPLE 12

A 10% FC-47 emulsion was prepared in the manner as described in Example 1. Mice were infused as in Examples 10–11, and GC analyses were similarly performed for comparison with PP5 and PP9. The results are reported in Table IV. Three mice, A, B and C were tested.

gas chromatograph. The dried liver was then ground into a powdery dust and mixed with hexane. A sample of this liver hexane mixture gave a chromatogram with the peaks identical to a chromatogram of a sample of original FC-47 from the lot number used to infuse the mouse. The weight of the dried liver was greater than would be normal for liver tissue alone and the quantity determined by biphenyl method was considerable. It cannot be stated at this time whether the fluorochemical had been loosely complexed with substances in the liver and the bond was broken by grinding and mixing with hexane, or whether all of the fluorochemical present was extracted by hexane, or whether some may have formed new compounds with proteins or whatever reason. However, it is to be observed that FC-47 liquid would evaporate in seconds if rubbed on a table top at normal atmospheric conditions. Yet, FC-47 stays in the liver of a mouse for at least 1 year, in a drying atmosphere is undetected by gas chromatographic analysis

TABLE IV

THE EXCRETION OF FLUOROCARBON VAPOR BY THE MOUSE

| DAYS AFTER | | PP5 CHART READING | | PP5 NANOLITERS PER LITER | CHART READING | | PP9 NANOLITERS PER LITER | FC-47 CHART READING |
|---|---|---|---|---|---|---|---|---|
| | | CIS | TRANS | | PP5 | PP9 | | |
| 1 day | mouse A | 11 | 51 | 16 | 13 | 2 | 4 | 0 |
|  | mouse B | 36 | 79 | 29 | 48 | 17 | 16 | 0 |
| 2 day | mouse A | 39 | 87 | 32 | 20 | 8.4 | 7 | 0 |
|  | mouse B | 39 | 76 | 29 | 24 | 2.5 | 6 | 0 |
| 5 day | mouse A | 13 | 23 | 9 | — | — | 0 | |
|  | mouse B | — | — | — | 20 | 15.6 | 9 | 0 |
|  | mouse C | — | — | — | 33 | 16 | 12 | 0 |
| 7 day | mouse A | 13 | 15 | 7 | — | — | — | 0 |
|  | mouse B | — | — | — | 21 | 11.4 | 8 | 0 |
|  | mouse C | — | — | — | 20.3 | 9.6 | 7 | 0 |
| 9 day | mouse A | 24 | 25 | 12 | — | — | — | 0 |
|  | mouse B | — | — | — | 31.6 | 16.6 | 12 | 0 |
|  | mouse C | — | — | — | 35.5 | 19.0 | 13 | 0 |
| 12 day | mouse A | 30 | 30 | 15 | — | — | — | 0 |
|  | mouse B | — | — | — | 33.4 | 19.2 | 12 | 0 |
|  | mouse C | — | — | — | 33.0 | 18.8 | 12 | 0 |

Several qualitative observations can be made upon review of the data of Table IV. First, perfluorocyclocarbons PP5 and PP9 are excreted by the mouse through its tissue, primarily the lungs and skin, as vapor. Second, in confirmation of the faster rate of escape for PP5 over PP9 reported leaving the liver and spleen, PP5 vapor is excreted at a faster rate than PP9 (PP9 used actually contained some PP5 as indicated under the "PP9+column"). Also, for the non-cyclic compound, FC-47, no excreted vapor was detected by the CG apparatus. This complements the data showing liver and spleen retention of such other fluorocarbons. Of the two isomers of PP5, the trans isomer initially leaves at a faster rate than the cis form. The data of Table IV supports the qualitative observations just made. While the data also provides quantitative information on the excretion of fluorocarbons tested, the quantitative values reported do not take into consideration relative experimental inaccuracies in the techniques employed.

Concerning the retention of FC-47, the liver of a mouse, sacrificed approximately one year after infusion of FC-47, was placed in a bottle inside of a jar containing some silica gel until dried. Samples of the air in the bottle showed no trace of FC-47 when injected into the and is only detected in the liver upon grinding and extraction with hexane.

EXAMPLE 13

A young male cat was anesthetized with Nembutal and a cannular was put in the right jugular vein. The animal was allowed to recover until 3:30 p.m. the next day. A 250 μl sample of breath was then tested for fluorocarbon and the Varian gas chromatograph reading was 0. An emulsion of PP5 (10%) in 5% Pluronic F68 was prepared as in Example 1 to be given at a dose of 30 cc's per kg. of body weight.

At 3:35 p.m., 1 cc of emulsion was injected intraveneously and PP5 appeared on the cat's breath immediately as shown by a 250 μl sample analysis as above. Then, the rest of a 75 cc dose was administered during which the animal was awake, remained alert and purring and playing with a toy. At 5 p.m. postop, a blood sample was taken. Also, at 5:15 p.m. on the first day after, and at 1:15 p.m. on the second day after, blood samples were taken and analyzed for fluorocarbon by the above biphenyl method. These analyses, along with an analysis of a urine sample taken by direct puncture of the cat's bladder, and other observations are reported in Table V.

On the 2nd day after, the cat was anesthetized again and a small plastic cup having a volume of 10 cc's was merely held tightly against the fur of the right hind leg for 2 minutes. Gas chromotographic analysis of a 250 μl sample of gas taken within a few seconds from the cup detected presence of PP5. Soon thereafter, when this cup was placed over a freshly shaved skin area of the cat even more PP5 was detected in a similar 250 μl gas sample taken. Several minutes later, the cup was then cemented in place over the shaved area, so that the skin was allowed to heal and a further 250 μl gas sample was taken. 1 cc of cat blood sample at 20°C was then placed in the bottom of a glass vial having a volume of 20 cc and the vapor above the blood was analyzed by GC and significant amounts of PP5 were detected. When the blood was warmed to 40°C even more PP5 in the vapor was found. The gas samples of breath, fur shaved skin, cemented cup, blood at 20°C and blood at 40°C were all analyzed for PP5 by the gas chromatograph and reported in Table VI in nanoliters PP5 per liter of sample. The vapor above 1 cc of urine sample taken above was also analyzed and likewise reported in Table VI.

TABLE V

| DAY | TIME | SAMPLE | PP5 LEVEL IN BLOOD AND URINE | | | | % PP5 | |
|---|---|---|---|---|---|---|---|---|
| | | | HCT[1] | FCT[2] | WBC[3] | DENSITY | Dupl. | Avg. |
| | 5 PM | Blood | 21.5 | 6.5 | 1 | 1.071 | 3.6 | |
| | | | | | | | 3.0 | 3.3 |
| 1st day postop | 5:15 PM | Blood | 27 | 2.0 | ½ | 1.0503 | 0.78 | |
| | | | | | | | 0.78 | 0.78 |
| 2nd day postop | 1:15 PM | Blood | 34.5 | ¼ | ½ | 1.0512 | 0.11 | |
| | | | | | | | 0.11 | 0.11 |
| 3rd day postop | 4:00 PM | Urine | | | | | 0.044 | |
| | | | | | | | 0.036 | 0.04 |

HCT[1] is packed cell volume of red blood cells ("hematocrit")
FCT[2] is packed volume of fluorocarbon particles ("fluorocrit")
WCB[3] is packed white cell volume

TABLE VI

PERFLUORODECALIN CONTENT OF SAMPLES

| SAMPLE NO. | TYPE | NANOLITERS PER LITER |
|---|---|---|
| 1. | breath | 48 |
| 2. | fur | 1.5 |
| 3. | freshly shaved skin | 2.3 |
| 4. | from plastic cup cemented to skin | 12 |
| 5. | blood at 20°C | 93 |
| 6. | blood at 40°C | 240 |
| 7. | urine | 0.3 |

Tables V and VI demonstrate a number of remarkable facts. Blood analyses of Table V show a relatively high level (about 3.3%) of PP5 shortly after intravenous administration. After the first full day, the PP5 level drops off to about 0.78% and then, after 1 5/6 days, to a level of about 0.11%. A very small amount of PP5 was found in the urine sample, i.e., 0.04%. Table VI shows the relative amounts of PP5 vapor being excreted from the cat. More vapor is excreted through the lungs of the cat (as detected in the breath) than through the skin (skin cap sealed sample). The fur and skin samples demonstrated less PP5 vapor detected by mere placement of the cup over the fur and skin, which is to be expected. The vapor analysis of blood samples at 20°C and 40°C showed almost a three fold increase in vaporization of PP5 with the increased temperature. Finally, the urine gas sample showed a very slight amount of PP5 and it is not clear whether such an amount results from tissue diffusion or whether it is passed into the bladder with waste fluids. In any event, the vapor excretion phenomenon of the perfluorocyclocarbon PP5 from the animal body through the tissue, especially the lungs and skin, is confirmed by the above data.

Thus having described this invention, its various embodiments, its preferred mode of operation and its separably distinct features, a person of ordinary skill will understand in view thereof that variations with respect to these teachings may be made without departing from the spirit and scope of this invention.

What is claimed is:

1. An artificial blood comprising an aqueous emulsion containing emulsified particles having a particle size up to about 100 microns of a RES-phobic perfluorocyclocarbon, an emulsifying agent in a non-toxic non-hemolytic amount, and water, said particles contained in an amount sufficient to support an oxygen carrying function, said perfluorocyclocarbon having a vapor pressure which permits it to leave the RES without causing adverse gas collection in animal tissue.

2. The composition of claim 1 wherein said fluorocarbon is selected from the group consisting of perfluoro (methylcyclohexane), perfluoro (1,3-dimethylcyclohexane), perfluoro (decahydronaphthalene), perfluoro (decahydro-1-methylnaphthalene) and perfluoro (decahydrodimethylnaphthalene), or mixtures thereof.

3. The composition of claim 1 wherein said perfluorocyclocarbon has a vapor pressure of within the range of about 1 to about 50 torr at 37.5°C.

4. The composition of claim 1 wherein said perfluorocyclocarbon is perfluoro (decahydronaphthalene).

5. The composition of claim 1 wherein said perfluorocyclocarbon comprises a mixture of perfluoro (decahydronaphthalene) and perfluoro (1,3-dimethylcyclohexane).

6. The composition of claim 2 wherein said emulsion contains an emulsifying agent comprising polyoxyethylene-polyoxypropylene copolymer.

7. The composition of claim 6 wherein said emulsion contains an ionic component in an amount to provide a non-hypertonic emulsion.

8. A method for supporting intravascular oxygen-carbon dioxide transport in an animal body which comprises the intravascular administration of an artificial blood defined in claim 1.

9. The method of claim 8 wherein said perfluorocyclocarbon has a vapor pressure of within the range of about 1 to about 50 torr at 37.5°C.

10. The method o claim 8 wherein said perfluorocyclocarbon is selected from the group consisting of perfluoro (methylcyclohexane), perfluoro (1,3-dimethylcyclohexane), perfluoro (decahydronaphthalene), perfluoro (decahydro-1-methylnaphthalene) and perfluoro (decahydrodimethylnaphthalene) or mixtures thereof.

11. The method of claim 8 further comprising the step of exposing the animal lungs to an outside environment comprising a perfluorocyclocarbon vapor.

12. The method of claim 11 wherein said intravascularly administered perfluorocyclocarbon has a vapor pressure greater than about 40–50 torr at 37.5°C.

13. The method of claim 8 wherein said perfluorocyclocarbon is present in a concentration of about 10 to about 30% by volume of said emulsion.

14. The method of claim 8 wherein said intravascularly administered perfluorocarbon escapes from the animal body by way of the tissue.

15. The method of claim 14 wherein the perfluorocarbon escapes as vapor excreted from the animal lungs.

16. The method of claim 14 wherein the perfluorocarbon escapes as a vapor excreted from the animal skin.

17. The composition of claim 1 wherein said particles have an average particle size within the range of about 0.001 to about 0.1 micron.

18. A method for supporting respiration of an animal which comprises external exposure of the animal to a fluid external respiration medium consisting essentially of a liquid RES-phobic perfluorocyclocarbon having oxygen dissolved therein, said perfluorocyclocarbon having a vapor pressure which permits it to leave the RES without causing adverse gas collection in the animal tissue.

19. A method for supporting oxygen transfer in an animal organ which comprises externally perfusing the animal organ with a liquid RES-phobic perfluorocyclocarbon having oxygen dissolved therein, said perfluorocyclocarbon having a vapor pressure which permits it to leave the organ without causing adverse gas collection in the organ tissue.

* * * * *

UNITED STATES PATENT OFFICE
CERTIFICATE OF CORRECTION

PATENT NO. : 3,911,138
DATED : October 7, 1975
INVENTOR(S) : Leland C. Clark, Jr.

It is certified that error appears in the above-identified patent and that said Letters Patent are hereby corrected as shown below:

In the Abstract

Line 3 "is" should be --in--

Line 19 "amimal" should be --animal--

In the Specification

Col. 1, line 18 "Brething" should be --Breathing--

Col. 1, line 20 "demonstration" should be --demonstrated--

Col. 4, line 6 "deviatives" should be --derivatives--

Col. 4, line 11 "perhpas" should be --perhaps--

TABLE I, heading "SPECIFIC RAVITY" should be --SPECIFIC GRAVITY--

Col. 4, line 63 "infussion" should be --infusion--

Col. 7, line 30 "about" should be --above--

Col. 8, line 45 "kideny" should be --kidney--

Col. 8, line 47 "heat" should be --heart--

Col. 9, line 1 "blush-red" should be --bluish-red--

Col. 11, line 60 "mixture" should be --mixer--

Col. 12, line 11 "Large" should be --Larger--

Col. 12, line 49 "2H" should be --2$\underline{H}$--

UNITED STATES PATENT OFFICE
CERTIFICATE OF CORRECTION

PATENT NO. : 3,911,138  
DATED : October 7, 1975  
INVENTOR(S) : Leland C. Clark, Jr.

PAGE - 2

It is certified that error appears in the above-identified patent and that said Letters Patent are hereby corrected as shown below:

Col. 13, line 29 "precedures" should be --procedures--

TABLE II, heading "1 MONTHS" should be --1 MONTH--

TABLE III, heading "1 MONTHS" should be --1 MONTH--

TABLE III, heading "3 MONTH" should be --3 MONTHS--

TABLE III, heading "5 MONTH" should be --5 MONTHS--

TABLE IV, under the heading PP9 NANOLITERS PER LITER, fifth line down, "0" should be a dash TABLE IV, under the heading FC-47 CHART READING, fifth line down, the blank space should be --0--

Col. 17, line 50 "the "PP9+column)" should be --the "PP9" column)--

Col. 17, line 52 "CG" should be --GC--

Col. 17, line 53 "showing liver" should be --showing greater liver--

Col. 18, line 47 "cannular" should be --cannula--

Col. 20, line 55 "whereiin" should be --wherein--

Col. 21, line 4 "method o" should be --method of--

Signed and Sealed this third Day of February 1976

[SEAL]

Attest:

RUTH C. MASON  
Attesting Officer

C. MARSHALL DANN  
Commissioner of Patents and Trademarks

UNITED STATES PATENT AND TRADEMARK OFFICE

CERTIFICATE EXTENDING PATENT TERM
UNDER 35 U.S.C. 156

Patent No.    : 3,911,138

Dated         : October 7, 1975

Inventor(s)   : Leland C. Clark, Jr.

Patent Owner  : Children's Hospital Medical
                Center of Cincinnati, Ohio This is to certify that there has been presented to the

COMMISSIONER OF PATENTS AND TRADEMARKS an application under 35 U.S.C. 156 for an extension of the patent term. Since it appears that the requirements of the law have been met, this certificate extends the term of the patent for the period of

2 YEARS with all rights pertaining thereto as provided by 35 USC 156 (b).

I have caused the seal of the Patent and Trademark Office to be affixed this 7th day of December 1990.

Harry F. Manbeck, Jr.
Assistant Secretary and Commissioner
  of Patents and Trademarks

REEXAMINATION CERTIFICATE (3031st)

United States Patent [19]
Clark, Jr.

[11] B1 3,911,138
[45] Certificate Issued Oct. 29, 1996

[54] ARTIFICIAL BLOOD AND METHOD FOR SUPPORTING OXYGEN TRANSPORT IN ANIMALS

[75] Inventor: Leland C. Clark, Jr., Cincinnati, Ohio

[73] Assignee: Children's Hospital Medical Center, Cincinnati, Ohio

Reexamination Requests:
No. 90/001,811, Jul. 21, 1989
No. 90/002,928, Dec. 24, 1992

Reexamination Certificate for:
Patent No.: 3,911,138
Issued: Oct. 7, 1975
Appl. No.: 335,454
Filed: Feb. 26, 1973

Certificate of Correction issued Feb. 3, 1976.

[51] Int. Cl.⁶ .................................................. A61K 31/025
[52] U.S. Cl. ............................ 514/746; 436/11; 436/15; 514/747; 514/756
[58] Field of Search ...................... 436/11, 15; 514/746, 514/747, 756

[56] References Cited

U.S. PATENT DOCUMENTS 3,958,014   5/1976   Watanabe et al. ...................... 514/772

*Primary Examiner*—David Saunders

[57] ABSTRACT

Perfluorocyclocarbons and emulsions containing emulsified particles of these perfluorocarbons are useful is supporting life as intravascular oxygen and carbon dioxide transport agents. Stable emulsions of perfluorocarbocyclic derivatives are prepared for use as artificial bloods and perfusates for organs. Intravenously infused emulsions containing perfluorocyclocarbons such as perfluoro(methylcyclohexane), perfluoro(1,3-dimethylcyclohexane), perfluoro(decahydronaphthalene), perfluoro(decahydro-1-methylnaphthalene), perfluoro (decahydrodimethylnaphthalene), and the like, serve as intravascular oxygen and carbon dioxide transport agents. Fluorocarbon liquids are also useful as an external respiration media for transporting oxygen-carbon dioxide necessary to support intravascular respiration. Perfluorocyclocarbons have been found after intravenous emulsion infusion as artificial bloods to collect in the reticuloendothelial system (RES) of the animal body. However, it has also been found that perfluorocyclocarbon compounds leave the RES of the animal body and certain of these compounds, e.g., perfluoro(decahydronaphthalene), leave the RES at a much faster rate than others. Futhermore, after the intravenously infused perfluorocyclocarbon emulsions function as artificial bloods, the perfluorocyclocarbons have the capability of leaving the animal body through the tissue, e.g., the lungs and skin.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 11–12 is confirmed.

Claims 1–10 and 13–19 are cancelled.

* * * * *